United States Patent
Wimmer et al.

(10) Patent No.: US 8,171,945 B2
(45) Date of Patent: May 8, 2012

(54) VEHICLE WASH SYSTEM COMPRISING A PLURALITY OF TREATMENT UNITS

(75) Inventors: Georg Wimmer, Affing (DE); Rudiger Hirschmann, Augsburg (DE)

(73) Assignee: Washtec Holding GmbH, Augsburg (DE)

( * ) Notice: Subject to any disclaimer, the term of this patent is extended or adjusted under 35 U.S.C. 154(b) by 472 days.

(21) Appl. No.: 12/438,100

(22) PCT Filed: Jul. 26, 2007

(86) PCT No.: PCT/EP2007/057731
§ 371 (c)(1),
(2), (4) Date: Apr. 7, 2009

(87) PCT Pub. No.: WO2008/031668
PCT Pub. Date: Mar. 20, 2008

(65) Prior Publication Data
US 2010/0170543 A1   Jul. 8, 2010

(30) Foreign Application Priority Data

Sep. 11, 2006  (DE) .......................... 10 2006 043 198

(51) Int. Cl.
*B08B 3/02* (2006.01)
(52) U.S. Cl. ........................ 134/123; 134/172
(58) Field of Classification Search ................... 134/123, 134/172
See application file for complete search history.

(56) References Cited

U.S. PATENT DOCUMENTS

| 2,881,459 | A | * | 4/1959 | Emanuel | 15/53.3 |
| 3,292,192 | A | * | 12/1966 | Maxwell | 15/53.3 |
| 3,410,284 | A | * | 11/1968 | Burger | 134/45 |
| 3,487,490 | A | * | 1/1970 | Wuster | 15/53.2 |
| 3,658,590 | A | * | 4/1972 | Huebner et al. | 134/32 |
| 3,793,663 | A | * | 2/1974 | Lieffring | 15/53.3 |
| 3,797,059 | A | * | 3/1974 | Smith | 15/53.3 |
| 3,877,107 | A | * | 4/1975 | Cirino | 15/302 |
| 4,301,566 | A |   | 11/1981 | Weigele |  |
| 4,393,602 | A | * | 7/1983 | Smith | 34/506 |

FOREIGN PATENT DOCUMENTS

| DE | 19512302 A1 | 10/1996 |
| DE | 202006003826 U1 | 6/2006 |
| FR | 2441519 A1 | 6/1980 |
| GB | 1249145 A | 10/1971 |
| JP | 60-161205 | * 8/1985 |
| JP | 01-254450 | * 10/1989 |

(Continued)

OTHER PUBLICATIONS

European Patent Office 0 349 334 Jan. 1990.*

(Continued)

*Primary Examiner* — Frankie L Stinson
(74) *Attorney, Agent, or Firm* — Martin Fleit; Paul D. Bianco; Fleit Gibbons Gutman Bongini & Bianco PL

(57) ABSTRACT

The invention relates to a vehicle wash system comprising a first treatment unit (2) arranged on a frame (1) so as to be height-adjustable and at least one second treatment unit (3) arranged on the frame (1) so as to be height-adjustable. In order to reduce the components required for driving and controlling the treatment units (2, 3) the latter are coupled to a common drive motor (11) via a traction mechanism drive (12, 13, 14, 15) for their mutual adjustment.

7 Claims, 4 Drawing Sheets

FOREIGN PATENT DOCUMENTS

| JP | 02-024250 | * | 1/1990 |
| JP | 04-050061 | * | 2/1992 |
| JP | 200-011795 | * | 1/2003 |

OTHER PUBLICATIONS

International Search Report published Mar. 20, 2008 of PCT/EP2007/057731 filed Jul. 26, 2007.

Written Opinion published 2008 of PCT/EP2007/057731 filed Jul. 26, 2007.

International Preliminary Report on Patentatibility published May 12, 2009 of PCT/EP2007/057731 filed Jul. 26, 2007 (Eng. translation).

Written Opinion published May 8, 2009 of PCT/EP2007/057731 filed Jul. 26, 2007 (Eng. translation).

* cited by examiner

VEHICLE WASH SYSTEM COMPRISING A PLURALITY OF TREATMENT UNITS

FIELD OF THE INVENTION

The invention relates to a vehicle wash system comprising a plurality of wash units.

BACKGROUND OF THE INVENTION

As a rule, a vehicle wash system also has, apart from one or more horizontal height-adjustable wash units, such as, for example, roof brushes, additional height-adjustable treatment units in the form of horizontal drying nozzles or the like. Such horizontal treatment units are commonly moved by means of separate hoist drives independent of each other. As a rule, this occurs via a winder drive by means of cable drives or flat belt drives or by means of toothed belt drives with corresponding deflection means and counterweights. In this connection, each of the units, such as roof brushes or horizontal drying nozzles, is equipped with a dedicated hoist motor, that admittedly requires a correspondingly high cost for the drive and control thereof.

SUMMARY OF THE INVENTION

The problem of the invention is to create a vehicle wash system of the aforementioned type that, at a low cost for the control and drive thereof, enables a reliable cleaning and drying of a vehicle.

This problem is solved by means of a vehicle wash system having the features as set forth in the independent claim(s). Expedient improvements and advantageous embodiments of the invention are the object of the dependent claims.

An essential advantage of the vehicle wash system according to the invention is that a plurality of treatment units can be moved via a traction mechanism drive by means of a single drive motor. This can reduce the number of drive motors and lower the expenditure for control. In addition, the simplified drive concept enables a cost savings.

In a particularly expedient embodiment, the traction mechanism drive comprises a traction member and deflection rolls, via which the traction member is guided to one of the treatment units by a drive element set into rotation by the drive motor. Guidance of the traction member designed, for example, as a cable, belt or chain can be configured so that the drive motor is fastened in a stationary manner to the frame, wherein the traction member, starting from the drive motor, is guided first via a deflection roll on one of the treatment units in the manner of a loose roll of a pulley and furthermore deflected a second time via stationary deflection rolls on the frame and subsequently fastened to the second treatment unit.

In an alternative execution, the drive motor can however also be fastened to one of the two height-adjustable treatment units and the traction member guided from there to the second treatment unit only via stationary deflection rolls on the frame.

The drive can be designed, for example, as a winder drive, with one end of the traction member being wound on a drive roll set into rotation by the drive motor and the other end of the traction member being connected to the first treatment unit. The drive can also occur, particularly with the use of a chain or toothed belt as the traction member, via one deflection and a positive-fit drive element in the form of a sprocket wheel, belt pulley or the like.

Allocated to at least one of the treatment units is a locking arrangement, by means of which the respective treatment unit can be arrested in a preset end position, preferably the upper end position. Provided there is a sufficiently large weight difference between the treatment units, the locking arrangement can be provided only for the heavier treatment unit. However, corresponding locking arrangements can be mounted to both treatment units.

For a portal wash system the frame can be designed, for example, as a movable portal, wherein during cleaning, the wash brushes and drying nozzles, apart from a horizontal shifting, are also moved in the longitudinal direction of the vehicle. In the event of a vehicle wash plant in which a vehicle is moved in the longitudinal direction of the vehicle during cleaning, for example by means of a belt conveyor or chain conveyor, the frame can also be of a stationary execution.

BRIEF DESCRIPTION OF THE DRAWINGS

Additional distinctive features and advantages of the invention arise from the following description of two embodiments with the aid of the drawing. Shown are.

DETAILED DESCRIPTION OF THE INVENTION

Figure 1:
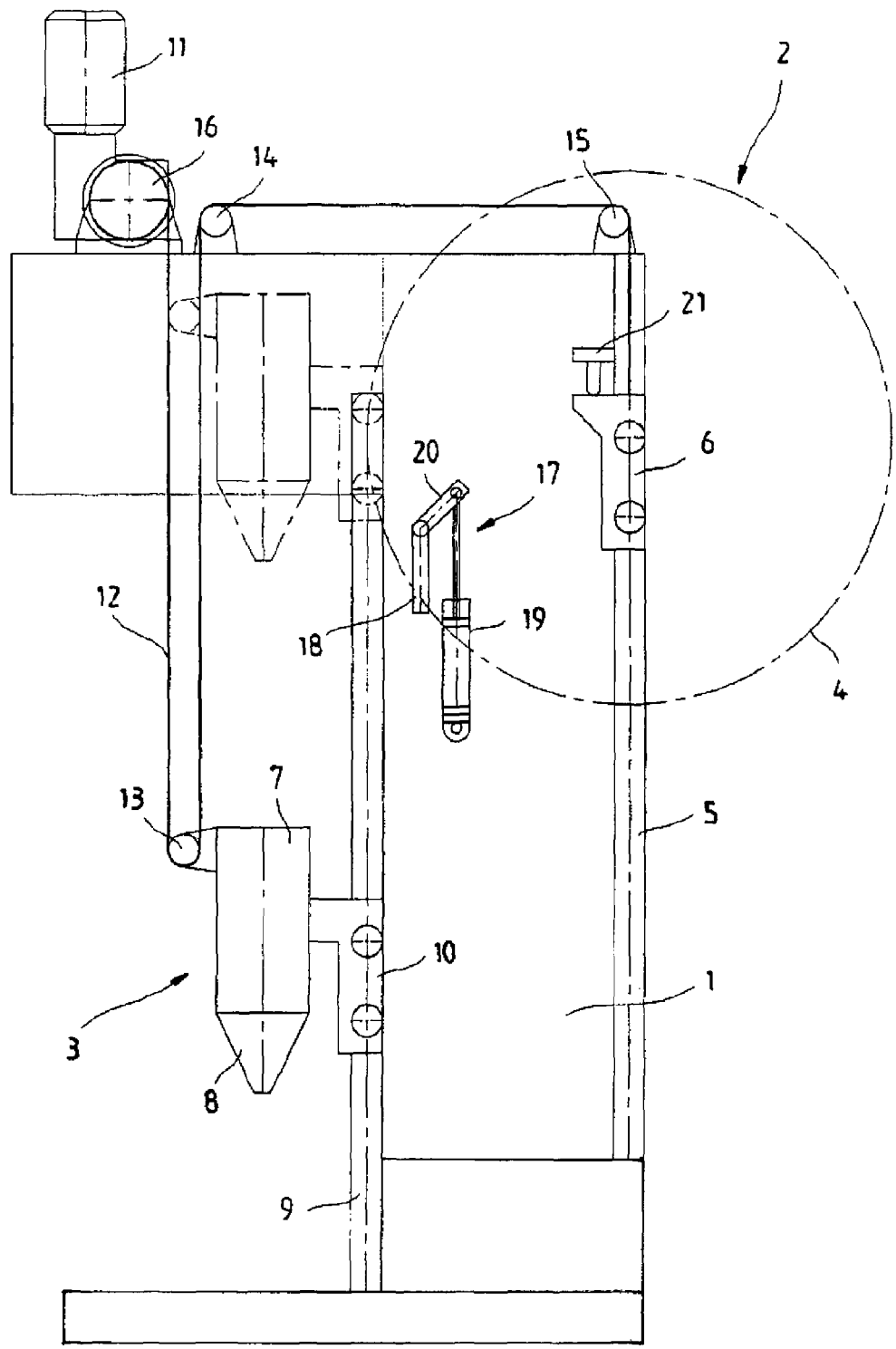
FIG. 1, a schematic side view of one part of a vehicle wash system comprising a horizontal wash brush and a horizontal drying arrangement in a first operating position.
Figure 2:
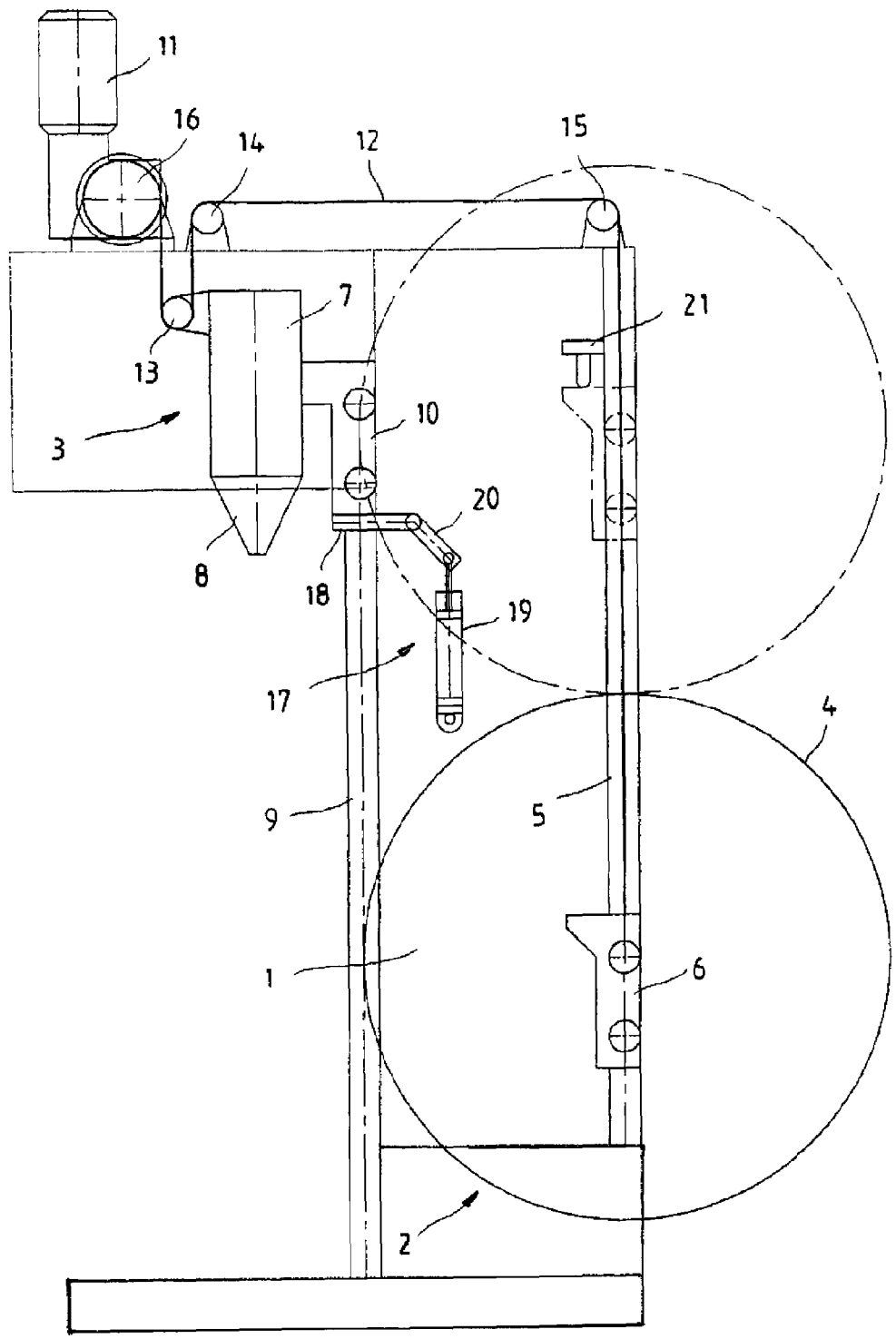
FIG. 2, a schematic side view of the part of the vehicle wash system from FIG. 1, in a second operating position.

The vehicle wash system represented schematically in different positions in side view in FIGS. 1 and 2 comprises a frame 1, executed here as a portal, on which are arranged in a height-adjustable manner a first treatment unit 2 executed as a horizontal brush and a second treatment unit 3 designed as a drying arrangement. The first treatment unit 2 comprises a wash brush 4 that is rotatable about a horizontal axis and driven by a motor and that is guided to be vertically sliding on the frame 1 by means of vertical guides 5 and guide blocks 6. For the execution shown, the second treatment unit 3 is realized as a horizontal roof dryer having a housing 7 and a nozzle head 8 directed downward, which run crosswise to the longitudinal direction of the vehicle across the entire vehicle width and which, by means of vertical guides 9 and guide blocks 10 allocated thereto, are likewise guided to be vertically sliding on the frame 1 executed as a portal. After a vehicle has been washed, an air flow produced by a blower and introduced into the housing 7 can be directed to the upper side of the vehicle by means of the nozzle head 8 in order to dry the vehicle. The vehicle wash system comprises, apart from the horizontal brush, side brushes as well and side dryers that, however, are not depicted here. These likewise can be arranged on the portal-like frame 1 or on an additional portal or frame.

For the embodiment depicted in FIGS. 1 and 2, a drive motor 11 is arranged on the frame 1 executed as a portal; said drive motor is coupled to the two treatment units 2 and 3 by means of a traction member 12 executed as a cable, belt or chain and diverse deflection rolls. The traction member 12 is guided by means of a first deflection roll 13 on the second treatment unit 3 and two stationary deflection rolls 14 and 15 on the frame 1, where one end of the traction member 12 is wound upon a drive roll 16 that rotates by means of the drive motor 11 and the other end of the traction member 12 is fastened to the first treatment unit 2.

Additionally fastened to the frame 1 is a locking arrangement 17 by means of which the second treatment unit 3 can be arrested in an upper end position. For the embodiment shown, the locking arrangement 17 comprises a pivoting stop 18 that can be made to pivot, via a lever 20, by means of a pneumatically or hydraulically activated actuating cylinder or other suitable actuating drive 19, between a downward-folded release position according to FIG. 1 and an upward-folded stop position according to FIG. 2. In the upward-folded stop position, the stop 18 rests against the underside of the block 10 and prevents lowering of the second treatment unit 3. Also fastened to the frame 1 is an upper stop 21 for the first treatment unit 2.

For the execution shown, there is a weight difference between the two treatment units 2 and 3, wherein the first treatment unit 2 is lighter than the second treatment unit 3 and the difference in weight is selected such that the first treatment unit 2 is drawn against the stop 21 by the heavier second treatment unit 3 according to FIG. 1, provided that the second treatment unit 3 is not arrested.

If for the position depicted in FIG. 1 the traction member 12 is rolled up by a corresponding rotation of the drive roll 16, the second treatment unit 3 is raised and can be moved from a lower position depicted by solid lines to an upper end position depicted by dashed lines. If by activating the locking arrangement 17 the second treatment unit 3 is arrested in the upper end position according to FIG. 2, the deflection roll 13 acts as a stationary deflection roll and the first treatment unit 2 can be moved upward or downward by means of a corresponding rotation of the drive roll 16.

Provided that the difference in weight of the treatment units is sufficiently great, a locking device is required only on the heavier treatment unit since when activating the drive motor, only the heavier treatment unit will move and the lighter one is drawn against the mechanical end stop. However, for other weight relationships, locking devices can also be provided on both treatment units.

This drive principle can be used to mutually adjust both treatment units by means of one single drive motor. If the first treatment unit is a matter of, for example, a wash brush and the second treatment unit is a matter of a drying arrangement on one portal, this in no way whatsoever represents a restricting of the operation of the vehicle wash system, since the wash brush and the drying arrangement are effective in any case in separate passes over the portal.

Figure 3:
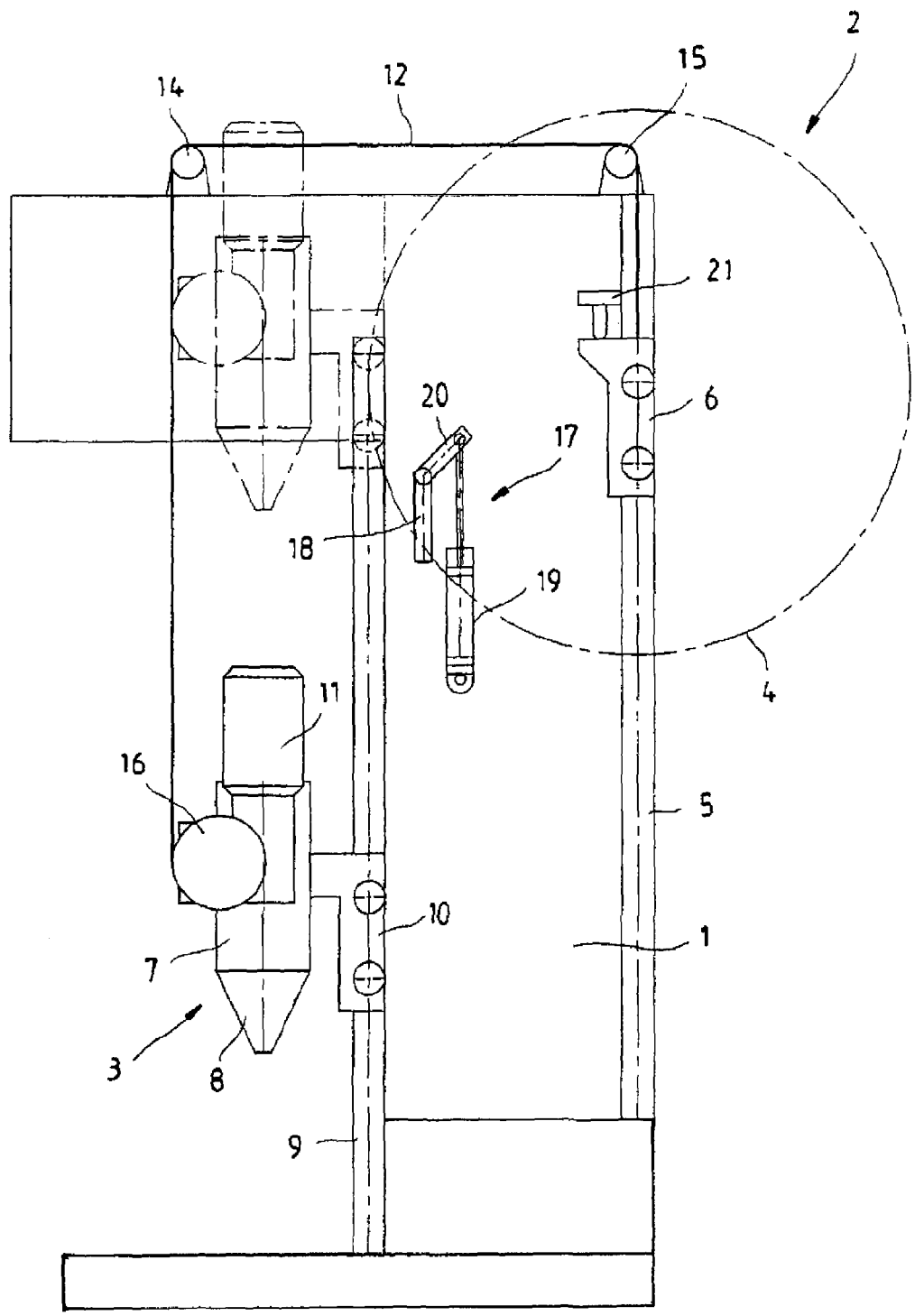
FIG. 3, a schematic of one part of an additional vehicle wash system comprising a horizontal wash brush and a horizontal drying arrangement in a first operating position and FIG. 4, a schematic side view of the part of the vehicle wash system from FIG. 3 in a second operating position.
Figure 4:
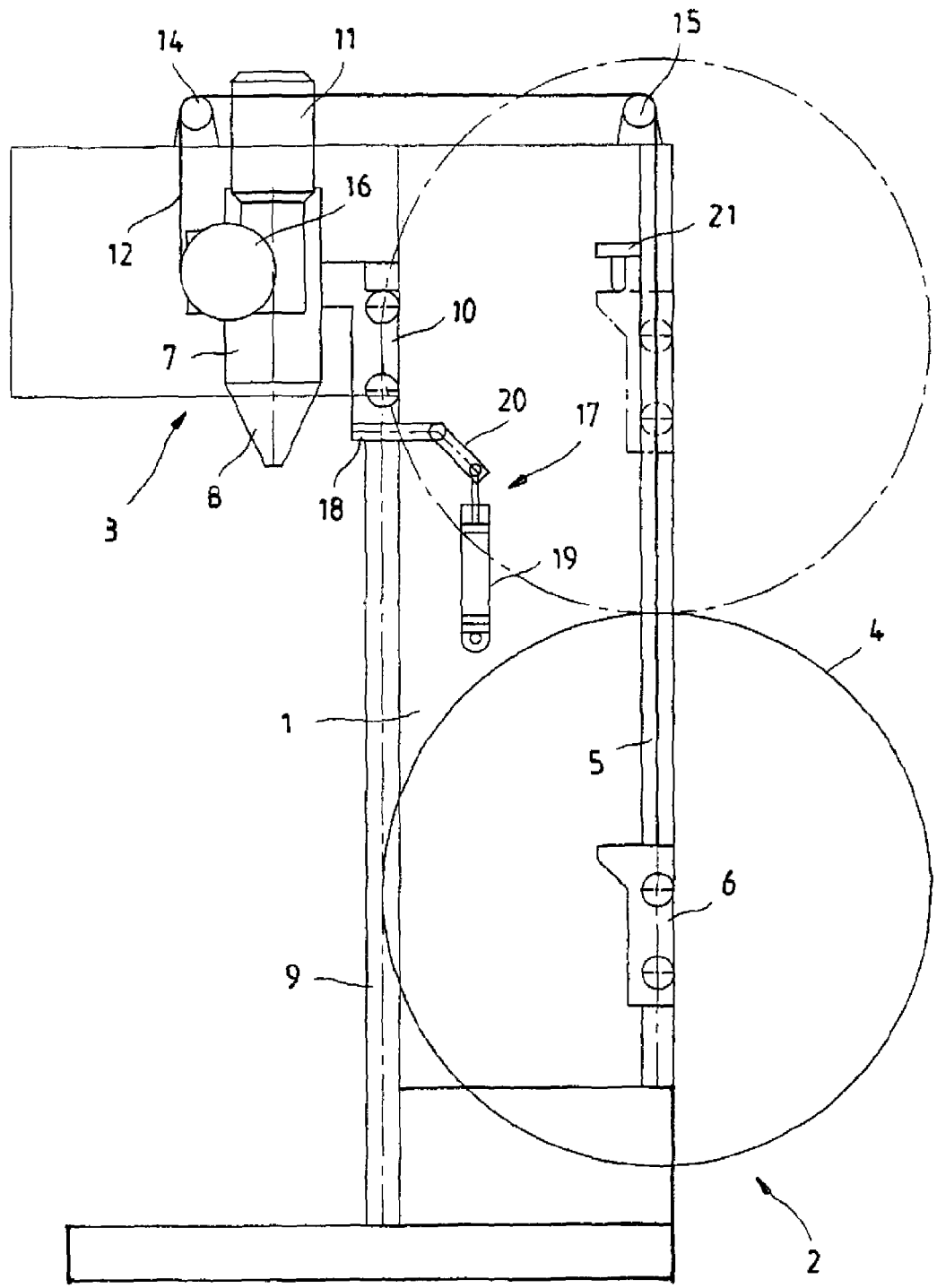

The second embodiment of a vehicle wash system represented in FIGS. 3 and 4 differs from the first embodiment only in that the drive motor 11 with drive roll 16, rather than being in a stationary arrangement on the frame 1, is arranged on the vertically sliding second treatment unit 3. Since the basic construction otherwise corresponds to the embodiment of FIGS. 1 and 2, corresponding components also are given the same reference numbers. Here, the traction element 12 is guided only via two deflection rolls 14 and 15 in a stationary arrangement on the frame 1, wherein one end of the traction member 12 is fastened to the first treatment unit 2 and the other end of the traction member 12 is wound upon the drive roll 16 of the drive motor 11 fastened to the second treatment unit 3.

If for the position depicted in FIG. 3, the drive roll 16 is rotated by the drive motor 11 in order to roll up the traction member 12, the second treatment unit 3 also is raised here and can be moved from a lower position represented in solid lines to an upper end position represented in dashed lines. If the second treatment unit 3, by means of activating the locking arrangement 17, is arrested in the upper end position according to FIG. 4, the treatment unit 2 can be lowered and raised afresh by means of a corresponding rotation of the drive roll 16.

The invention is not limited to the embodiments described above and represented in the drawings. It thus goes without saying that in lieu of a horizontal wash brush and horizontal drying arrangement, other treatment units can also be moved by means of the aforementioned drive concept.

The invention claimed is:

1. A vehicle wash system comprising:
   a frame having at least two substantially vertical guiding supports each defining a separate vertical guide axis having an uppermost extent and lowermost extent;
   a first treatment unit connected to a vertical guiding support to be movable along a vertical guiding axis between a maximum and minimum vertical point;
   a second treatment unit connected to a vertical guiding support to be movable along a respective vertical guiding axis between the uppermost extent and lowermost extent, wherein said second treatment unit is heavier than said first treatment unit;
   a flexible connector joining said first and second treatment unit; and
   a motor configured to move said flexible connector thereby moving said second treatment unit in a downward direction along the vertical guiding axis or in an upward direction along the vertical guiding axis when said first treatment unit is either fixed at a position by locking means or positioned at the uppermost extent, and moving said first treatment unit in an upward direction along the vertical guiding axis or in a downward direction along said vertical guiding axis when said second treatment unit is either at a fixed position by locking means or positioned at the lowermost extent.

2. The vehicle wash system according to claim 1, wherein said first treatment unit comprises a wash brush and said second treatment unit comprises a drying unit.

3. A vehicle wash system comprising:
   a frame having at least two substantially vertical guiding supports each defining a separate vertical guide axis;
   a first treatment unit connected to a vertical guiding support to be movable along the said respective vertical guiding axis;
   a second treatment unit connected to a vertical guiding support to be movable along the said respective vertical guiding axis, wherein said second treatment unit is heavier than said first treatment unit;
   a lock operative to maintain a vertical position of said second treatment unit;
   an upper stop operative to restrict said first treatment unit from moving above an uppermost extent; and
   a guide system comprising:
   a drive roller,
   a stationary deflection roller connected to said second treatment unit,
   a flexible connector connected to said first treatment unit, said stationary deflection roller, and windable about said drive roller, and
   a motor configured to rotate said drive roller thereby winding and unwinding said flexible connector, the winding and unwinding resulting in moving said second treatment unit in a downward direction along the vertical guiding axis or in an upward direction along the vertical guiding axis when said first treatment unit is positioned at said upper stop, and moving said first treatment unit in an upward direction along the vertical guiding axis or in a downward direction along said vertical guiding axis when said second treatment unit is locked at a vertical position or positioned at a lowermost extent on the vertical guiding axis.

4. The vehicle wash system according to claim 3, wherein said drive roller and said motor are secured to said frame.

5. The vehicle wash system according to claim 3, wherein said drive roller and said motor are secured to, and vertically adjustable with said second treatment unit.

6. The vehicle wash system according to claim 3, wherein said lock comprises a pivoting stop, pivotable between a folded position and an open position, said folded position restricting said second treatment unit from moving along said frame.

7. The vehicle wash system according to claim 3, wherein said first treatment unit comprises a wash brush and said second treatment unit comprises a drying unit.

* * * * *